March 8, 1955 J. M. HAGGARD ET AL 2,703,554
PORTABLE STOCK CHUTE
Filed April 16, 1953 2 Sheets-Sheet 1

INVENTORS
John M. Haggard
and
BY Paul H. McMurray
Robb & Robb
attorneys

March 8, 1955
J. M. HAGGARD ET AL
2,703,554
PORTABLE STOCK CHUTE
Filed April 16, 1953
2 Sheets-Sheet 2
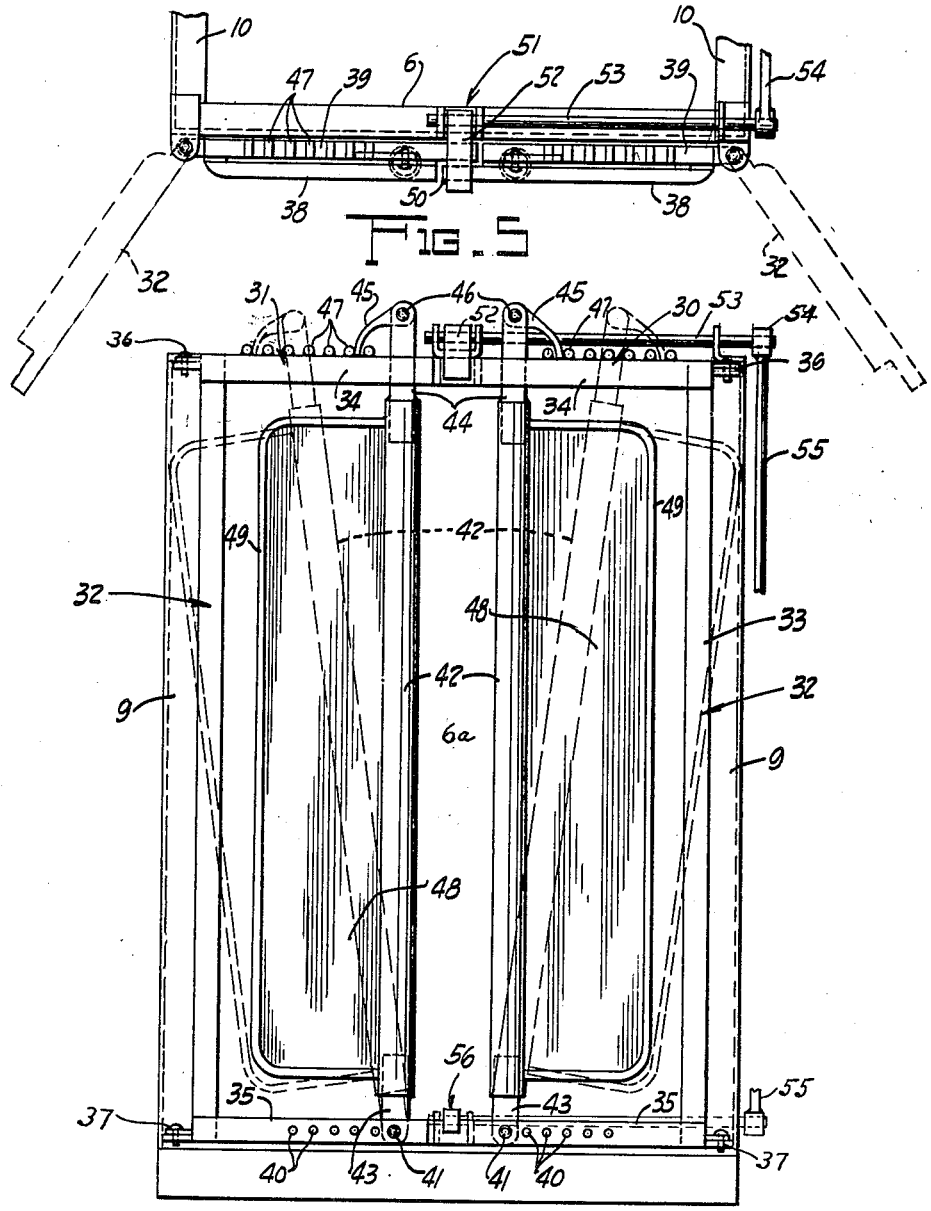
INVENTORS
John M. Haggard
and
BY Paul H. McMurray
Robb+Robb
attorneys

United States Patent Office 2,703,554
Patented Mar. 8, 1955

2,703,554
PORTABLE STOCK CHUTE

John M. Haggard and Paul H. McMurray, Delphi, Ind., assignors to Delphi Products Company, Incorporated, Delphi, Ind., a corporation Application April 16, 1953, Serial No. 349,262

4 Claims. (Cl. 119—99)

This invention relates to stock chutes, and more particularly to such chutes which are intended to be transported from place to place.

One of the primary objects of the invention is to provide such a portable chute which includes a novel form of combined stanchion and gate unit, which obviates certain difficulties heretofore encountered with prior types of such units.

Another object of the invention is the provision of such a novel combined unit which includes suitable adjusting instrumentalities so as to properly grip or hold the stock therein, and to subsequently permit the opening, so to speak, of the unit, or parts thereof, in order to permit the stock previously within the chute to move forwardly out of the same. Another object of the invention is to provide such a novel arrangement of combined stanchion and gate unit which enables the use of the chute as a treatment chute for cattle or the like, suitable provision being made for facilitating the entrance into and exit from the chute, with consequent reduction in possibility of injuring the animal, the chute in general being one which is used as a treatment chute.

Still another object of the invention is to provide such a novel chute which includes adjustable transporting wheels, whereby the chute may be raised and lowered to different elevations, so as to permit the access to and egress from the chute under all kinds of conditions of ground levels and other types of possible different elevations encountered in the use of the chute.

Still another object of the invention is to provide such a chute which includes the adjustable supporting wheels whereby the same may be independently adjustable, and yet the combined stanchion and gate unit will be readily operable to perform its function.

Other and further objects of the invention will be understood from a consideration of the specification appended hereto, and shown in the drawings, wherein:

Figure 5 is an enlarged top elevation or plan view, somewhat fragmentary, illustrating in greater detail the novel combined stanchion and gate units.

Figure 6 is a view in elevation showing further details of the combined stanchion and gate units, the same being somewhat enlarged in relation to the other views of the drawings, certain other details including the wheels and tongue, being omitted.

Figure 1:
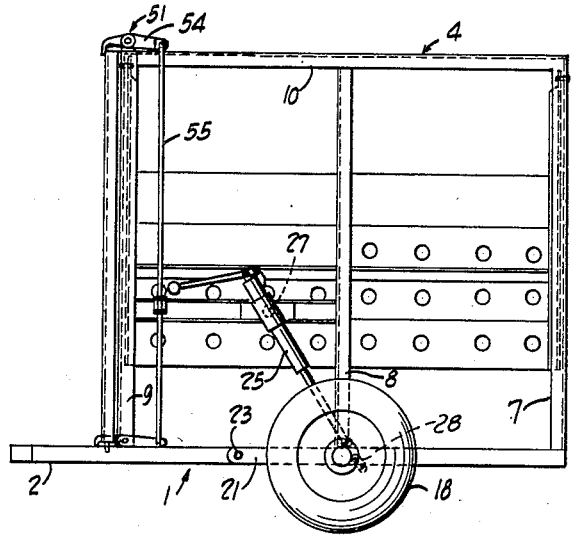
Figure 1 is a side elevation of the stock chute of this invention, showing certain of the adjusting instrumentalities and the general arrangement of the parts hereof.
Figure 2:
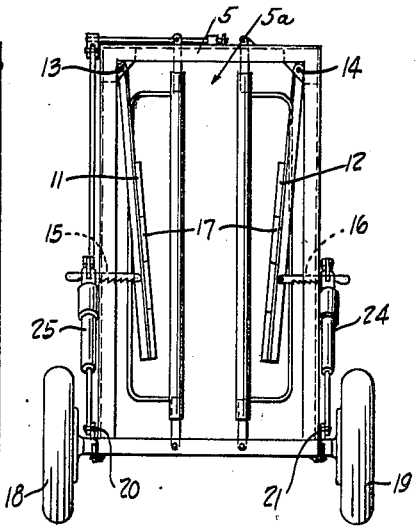
Figure 2 is a rear elevational view of the chute shown in Figure 1.
Figure 3:
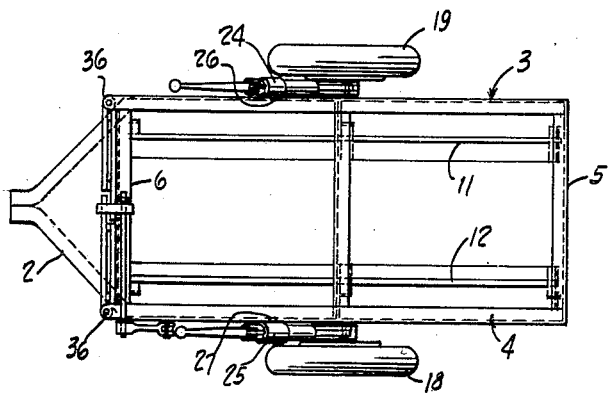
Figure 3 is a top plan view of the chute.

Referring initially to Figures 1 to 4 inclusive, the stock chute of this invention is shown as comprising a platform generally designated 1, at the forward end of which is provided a tongue 2, the platform having mounted thereon the generally rectilinear frame, including the spaced sides 3 and 4, and end members 5 and 6, the latter forming the open ends 5a and 6a. The spaced sides 3 and 4 are substantially identical, and include the upright frame members 7, 8 and 9, the members 7 and 9 being at the corners and the member 8 being substantially centrally located with respect thereto. At the top of each side is the longitudinal frame member 10, which, together with the rear and front members 5 and 6, respectively, form a substantially rigid upright framework.

Suitably suspended from each side near the longitudinal members 10, are the adjustable side members 11 and 12, the same being pivoted at 13 and 14, and being further provided with suitable adjusting bars 15 and 16, the side members 11 and 12 including the usual wood parts or planks 17 thereon. The side members 11 and 12 are intended to be susceptible of adjustment toward and from the animal in the chute so as to maintain the same in proper position for treatment, as will be readily understood, and the same are usually provided in such chute.

Figure 4:
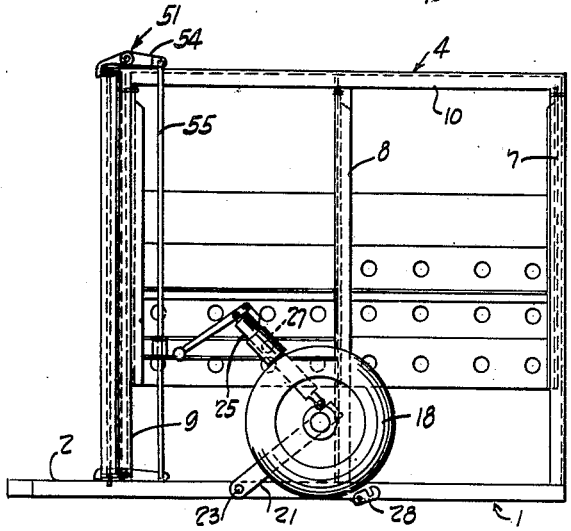
Figure 4 is a side elevational view of the chute showing the same as having been lowered into contact with the ground.

A platform 1 is adapted to be supported upon the wheels 18 and 19, the said wheels engaging at their axle portions with swingable arms 20 and 21, pivoted at 22 and 23 to the platform. Suitable hydraulic piston and cylinder units 24 and 25 are provided, the same being fastened at 26 and 27 to a longitudinal member at each side of the superstructure frame. Suitable instrumentalities are provided with the hydraulic piston and cylinder units 24 and 25 to enable the independent movement thereof. The said units are conventional in form and will therefore not be further referred to. It should be noted, however, that the arms 20 and 21 are susceptible of independent movement in accordance with the manipulation of the appropriate piston and cylinder units with which they are connected, it being apparent that the said piston and cylinder units are connected at the free end of the arm, so to speak, near the connection of the arm with its appropriate adjacent wheel. Further, as shown in Figure 4, a latch member 28 is provided for each of the respective arms, adapted to engage a pin provided thereon so as to maintain the wheels in the position shown in Figure 1 with the platform raised, and release of the same permitting the platform to be lowered to the ground.

Referring now to Figures 5 and 6, the novel stanchion and gate units are generally indicated at 30 and 31, the same being substantially identical in form, and thus description of one is believed to be sufficient so as to readily understand the construction of the other. It will be clear that such members are provided in pairs and include a gate frame 32, which consists of an upright or vertical frame member 33, and relatively short horizontal frame members 34 and 35 at the top and bottom, respectively, connected to the upright frame member 33. Adjacent the upper and lower corners of the connected frame members above described are the hinges 36 and 37, the hinges being in turn connected with the upper and lower parts of the frame members 9 at each forward corner of the platform 1. The transverse frame members 34 and 35 of the gate unit 32 are provided, as shown in Figure 5, with suitably spaced elements indicated at 38 and 39 in Figure 5. The bottom member 35 is constructed similarly to the member 34 and is provided with a series of openings therein adapted to receive and be pivotally connected, as at 41, to an upright tubular member 42 which comprises a part of the closure section of the gate. The tubular member is flattened at 43 at the bottom portion so as to be received in between the spaced members comprising the part 35 and mounted in the variety of positions provided by the openings 40.

At the top of the tubular member 42, the same is also flattened as at 44, the flattened portion being received between the members 38 and 39 so as to be laterally slidable therein. At the upper end of the flattened portion 44 the same is provided with a latch member 45 pivotally connected at 46. Along the upper surface of the lateral member 39 of the part 34 a series of abutments is provided, which are adapted to coact with the latch member 45 and maintain the closure member, including the tubular part 42, in a variety of adjusted positions. The closure member further includes a substantially rectangular plate 48, suitably connected to the tubular member 42, and being further provided with a stiffening member 49, which is welded at its ends to the tubular member 42, and with which, in combination with the part 48, is adapted to substantially close one-half of the open end of the superstructure frame with which it is associated.

It is understood that the closure member just described is duplicated at the left as seen in Figure 6, but it should be explained that the right hand closure member is adapted to overlap at 50, the left hand closure member for maintaining the same in closed position when a latch member generally indicated at 51 is in the position as shown in Figures 5 and 6. This latch unit 51 includes a latch 52, pivotally mounted with respect to the transverse frame member 6 upon a crank arm 53, which crank arm 53 extends outwardly and is equipped with a crank section 54 at its outer end. The crank member 53 is obviously mounted in suitable bearing ears extending upwardly from the member 6. As shown more particularly in Figure 1, the crank 54 is provided at one end with a vertical rod 55, pivotally connected thereto. It is also contemplated that a similar latch unit to the unit 51 and indicated at 56 is provided at the bottom or platform portion of the superstructure frame, the same being similarly mounted to the latch unit 51 just described. This latch unit 56 also includes an outwardly extending crank member and is equipped at its outer side or end with a crank arm which is also connected to the rod 55.

In view of the fact that the lower transverse member 35 of each gate and stanchion unit is overlapped by the corresponding member on the left in Figure 6, a condition substantially like that shown in Figure 5 will also exist.

Thus, when the rod 55 is manipulated in a downward direction, the respective latch units 51 and 56 are simultaneously operated, so as to release the gate and stanchion unit, permitting the same to swing into the dotted line positions shown in Figure 5.

In the use of the stock chute which has been described in detail, the same is generally lowered to the ground as shown in Figure 4, and the closure sections of the combined stanchion and gate unit are moved to the dotted line positions shown in Figure 6; thereafter the animal is caused to enter within the superstructure frame, and between the side members 11 and 12 thereof. Thereafter when the animal's head and neck have been appropriately positioned, the closure members are manipulated so as to bring the upright tubular members 42 thereof closely adjacent the animal's neck, the latches 45 being permitted to move into their positions between the abutments 47, as for example is shown in Figure 6 in full lines. Thus the animal is held in proper position and any treatment necessary may be effected. Thereafter, it is not necessary for the latch members 45 to be released to permit the animal to be removed from the chute, as further it is not necessary to cause the animal to back out of the chute, but manipulation of the latch units 51 and 56 may be effected to thereby release the combined gate and stanchion units 32 so as to swing into the dotted line positions shown in Figure 5. Thus the animal may move ahead through the front of the chute, and possibility of reinjuring the treated part is minimized.

It will also be apparent that the chute is of such a nature that it may be transported to the field and the animal treated at that point, regardless of the condition of the ground over which the vehicle must travel or at which it must stand. By suitable manipulation of the respective hydraulic piston and cylinder units 24 and 25, the platform may be adjusted into various positions so as to bring the same level and raise or lower the platform as desired to permit the access to the same and egress from the same by the animal.

It should also be understood that the stock chute herein generally described may be suitable for transport of animals from place to place, if the same becomes necessary, and the possibility of injury to the animal is reduced by the novel provisions of the combined stanchion and gate units provided. Further, by reason of the fact that the combined gate and stanchion units are of substantial height, animals of varying degrees of height may be treated in a similar manner, or transported therein, without requiring the animals to back out of position after treatment or after transport.

Having thus described my invention, what I claim as new and desire to secure by Letters Patent of the United States, is:

1. In a portable stock chute of the class described, in combination, a main frame, wheels supporting said frame, a superstructure frame connected therewith, said last named frame including spaced side members swingably mounted thereon for adjustment toward and from each other to engage and position an animal therebetween, devices engaging the superstructure frame and side members for maintaining said side members in adjusted positions, and a combined stanchion and gate unit comprising gate frames pivotally connected to the superstructure frame and freely swingable with respect thereto, gripping and closure sections on said gate frames to grip the neck of an animal when positioned between the side members, means on said section for adjustably positioning said sections when gripping the neck of an animal, and means on said superstructure frame to engage and to maintain said gate frames in locked position whilst said sections are in neck gripping position, said means including elements for simultaneously releasing said gate frames to enable the same to swing freely and facilitate release of an animal from within the superstructure frame through said gate unit.

2. In a portable stock chute of the class described, in combination, a main frame, wheels supporting said frame, a superstructure frame connected therewith, said last named frame including spaced side members swingably mounted thereon for adjustment toward and from each other to engage and position an animal therebetween, devices engaging the superstructure frame and side members for maintaining said side members in adjusted positions, and a combined stanchion and gate unit comprising gate frames pivotally connected to the superstructure frame and freely swingable with respect thereto, gripping and closure sections on said gate frames to grip the neck of an animal when positioned between the side members, means on said sections for adjustably positioning the gripping and closure sections comprising tubular generally vertical gripping parts having end sections, the lower end section being adjustably pivotally connected to the lower portion of the corresponding gate frame, the upper end section being slidably received between suitably formed parts of such frame, and a latch element pivotally connected to said upper end and adapted to engage any one of a series of stops on the gate frame, and means on said superstructure frame to engage and maintain said gate frame in locked position while said sections are in neck gripping position, said means including elements for simultaneously releasing said gate frame to enable the same to swing freely and facilitate release of an animal from within the superstructure frame through said gate unit.

3. In a portable stock chute of the class described, in combination, a main frame, wheels supporting said frame, a superstructure frame connected therewith, said last named frame including spaced side members swingably mounted thereon for adjustment toward and from each other to engage and position an animal therebetween, devices engaging the superstructure frame and side members for maintaining said side members in adjusted positions, a combined stanchion and gate unit comprising gate frames pivotally connected to the superstructure frame and freely swingable with respect thereto, said frames including portions adapted to interengage when in closed position, gripping and closure sections on said gate frames to grip the neck of an animal when positioned between the side members, means on said sections for adjustably positioning said sections when gripping the neck of an animal, and means on said superstructure frame to engage and to maintain said gate frames in locked position while said sections are in neck gripping position, the said means last named including latch parts engaging the portions of the gate frames referred to, and releasing elements being included in said means for simultaneously releasing said gate frames to enable the same to swing freely and facilitate release of an animal from within the superstructure frame through said gate unit, said elements including instrumentalities extending to one side of the superstructure frame and interconnected for simultaneous operation.

4. In a portable stock chute of the class described, in combination, a main frame, wheels supporting said frame, a superstructure frame connected therewith, said last named frame including spaced side members swingably mounted thereon for adjustment toward and from each other to engage and position an animal therebetween, devices engaging the superstructure frame and side members for maintaining said side members in adjusted positions, and a combined stanchion and gate unit comprising gate frames pivotally connected to the superstructure frame and freely swingable with respect thereto, gripping and closure sections on said gate frames to grip the neck of an animal when positioned between the side members, means on said sections for adjustably positioning said sections when gripping the neck of an animal, and means on said superstructure frame to engage and to maintain said gate frames in locked position while said sections are in neck gripping position, said means including elements for simultaneously releasing said gate frames to enable the same to swing freely and facilitate release of an animal from within the superstructure frame through said gate unit, the said supporting wheels are mounted upon swingable arms provided at opposite sides of the main frame, the said wheels being mounted at the extremities of said arms, and hydraulic instrumentalities are connected to said arms and the superstructure frame, said instrumentalities affording control of the swingable arms for regulating the height of the main frame with respect to the ground.

References Cited in the file of this patent

UNITED STATES PATENTS

| Number | Name | Date |
|---|---|---|
| 497,163 | Bowman et al. | May 6, 1893 |
| 902,638 | Allison | Nov. 3, 1908 |
| 970,187 | Cox | Sept. 13, 1910 |
| 1,502,155 | O'Brien | July 22, 1924 |
| 2,529,530 | Abildgaard et al. | Nov. 14, 1950 |
| 2,595,781 | Durham | May 6, 1952 |